INVENTORS.
Herbert A. Mook, Jr.
Michael K. Wilkinson
Grady W. Clark
Donald D. Bates BY Roland A. Anderson

ATTORNEY.

United States Patent Office 3,517,193
Patented June 23, 1970

1

3,517,193
MAGNETICALLY PULSED TIME-OF-FLIGHT NEUTRON SPECTROMETER
Herbert A. Mook, Jr., Michael K. Wilkinson, Grady W. Clark, and Donald D. Bates, Oak Ridge, Tenn., assignors to the United States of America as represented by the United States Atomic Energy Commission
Filed Aug. 29, 1968, Ser. No. 756,268
Int. Cl. G01t 3/00
U.S. Cl. 250—83.1                 9 Claims

ABSTRACT OF THE DISCLOSURE

A time-of-flight neutron spectrometer is provided which employs a magnetic pulser for chopping a neutron beam. The pulser is a ferrite crystal which is provided with a properly oriented magnetic drive coil. The crystal is biased with a constant low-value magnetic flux at right angles to flux lines produced by the drive coil thereby reducing the inherent neutron scattering in a Bragg-type reflection along the direction of the pulsed beam. The drive coil is pulsed by current obtained by selectively switching the energy stored in a pulse forming network. The atomic magnetic moments of the ferrite crystal are reoriented by the magnetic field pulse thus maximizing the magnetic scattering or reflecting properties of the crystal during the application of the pulse and thereby providing a neutron beam monochromator and pulser. The neutron pulse width and repetition rate can be easily varied by changing the current pulse to the drive coil.

BACKGROUND OF THE INVENTION

This invention was made in the course of, or under, a contract with the U.S. Atomic Energy Commission.

This invention relates to pulsed beam time-of-flight neutron spectrometers, and more specifically to a magnetically pulsed beam time-of-flight spectrometer for inelastic scattering measurements.

Time-of-flight neutron spectrometers are utilized in many types of research as in inelastic neutron scattering investigations for providing valuable informaton concerning the dynamic properties of materials. Most measurements are performed with either a three-axis crystal spectrometer or a pulsed meam time-of-flight spectromter. These techniques are complimentary and each offers specific advantages for certain types of investigations. The pulsed beam spectrometers usually has the advantage of a higher rate of data accumultion because neutrons of all velocities in each burst are counted, and multiple counters are used easily since the counters do not need to be moved during an experiment. Since the sample also remains stationary in the course of the experiment, the time-of-flight method is preferable in experiments where the sample must be contained in large equipment such as a high pressure apparatus or a large magnet.

Most present day pulsed beam spectrometers for inelastic scattering use high speed rotary disks or drums with apertures to pulse or chop a neutron beam. During a fraction of the rotation, a pulse of neutrons is passed through the pulser and the beam is then cut off. This gives a time origin or reference for the time-of-flight measurement. Most of these prior art devices utilize a second high speed rotor properly phased with the first rotor to obtain a neutron pulse with a small velocity spread. Both multiple rotor choppers and rotating crystal spectrometers that are phased with rotating collimators are successfully used. However, high speed rotating equipment is expensive to construct, requires considerable maintenance, and requires rigid safeguards to protect the operation in case the rotor should shatter. Furthermore, conventional rotor systems are not very flexible because it is impossible to vary the pulse length and repetition rate of the neutron independently without changing the rotors.

SUMMARY OF THE INVENTION

This invention provides an improved means for pulsing a neutron beam and has as its primary object to provide a simple magnetic pulser for pulsing neutron beams for time-of-flight measurements.

Still another object of the present invention is to provide a time-of-flight spectrometer which does not require high speed rotating equipment.

Yet another object of the present invention is to provide a neutron beam pulser in which the neutron pulse width and repetition rate can be easily varied.

Briefly, the invention resides in a magnetic neutron beam pulser for a time-of-flight neutron spectrometer and comprises an easily magnetizable ferrite crystal having a Bragg reflection with strong magnetic intensity and a very weak nuclear intensity for neutrons together with apparatus to periodically produce the magnetic reflection by the crystal. The crystal is constructed so as to have neutron scattering planes therein oriented perpendicular to two parallel surfaces of the crystal. It is disposed so that a portion of the neutrons directed thereupon at an acute angle are reflected from the scattering planes. A low magnetic field is continuously applied to the crystal so that its flux lines are perpendicular to the scattering plane and thereby suppresses substantially the natural neutron reflection from the scattering planes. A second stronger magnetic field is applied at predetermined time intervals whose flux lines are at an angle substantially perpendicular to the flux lines of the suppressing field so that when the second field is applied the neutron reflections from the scattering planes are increased substantially, thereby providing a neutron beam for a period of time approximately equal to the time interval that the second magnetic field is applied.

Other objects and many of the attendant advantages of the present invention will become evident from the following description when taken in conjunction with the accompanying drawings, wherein like reference numerals indicate similar items throughout the figures.

DESCRIPTION OF THE PREFERRED EMBODIMENT

In the art of crystal reflection or scattering of neutrons, a Bragg-type reflection is one in which a crystal will reflect a beam of neutrons with maximum distinctness when the beam is directed thereupon at certain angles $\theta$.

It is known in the art that the intensity of a scattered unpolarized neutron beam in a Bragg reflection from a crystal may be expressed as:

$$I = b(C^2 + q^2 D^2)$$

where I is the intensity, C is the nuclear scattering amplitude, D is the magnetic scattering amplitude, $b$ is a proportionality constant, and $q^2$ is a function of the angle between the scattering vector and the magnetization vector. If for a particular Bragg reflection C is made very small through the proper choice of materials, then the intensity is primarily affected by the value of $q^2$. It has been shown that when the scattering vector and the magnetization vector are aligned, the intensity is suppressed to substantially zero; and when they are perpendicular, the intensity becomes a maximum.

Figure 1:
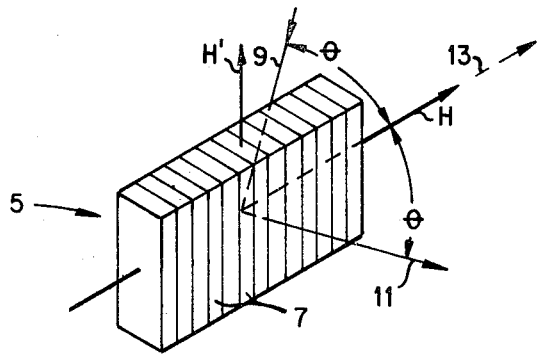
FIG. 1 is a schematic representation of the effect of a magnetic field upon Bragg-type reflections of neutrons for magnetic crystals.

This relationship is illustrated in FIG. 1 which is a transverse sectional view of a neutron scattering crystal 5. Such crystals have scattering planes 7 therein which act similarly to mirrors and are generally perpendicular to the surfaces of the crystal. An incoming neutron beam 9 would normally produce a reflected or scattered beam 11 with both 9 and 11 being at equal angles $\theta$ to the resultant scattering vector 13. The atomic spins, which are randomly oriented, within the crystal establish magnetic fields therein which may or may not be in the direction of the scattering vector 13. On an average, the resultant total magnetic field or magnetization causes the scattered intensity to be about two-thirds the maximum value. However, as discussed above, by applying a magnetic field H parallel to the scattering vector 13, all the magnetic moments are aligned and the scattering intensity is reduced to zero. Likewise, by applying a magnetic field H' at right angles to the scattering vector 13, the scattered beam 11 intensity reaches a maximum.

Figure 2:
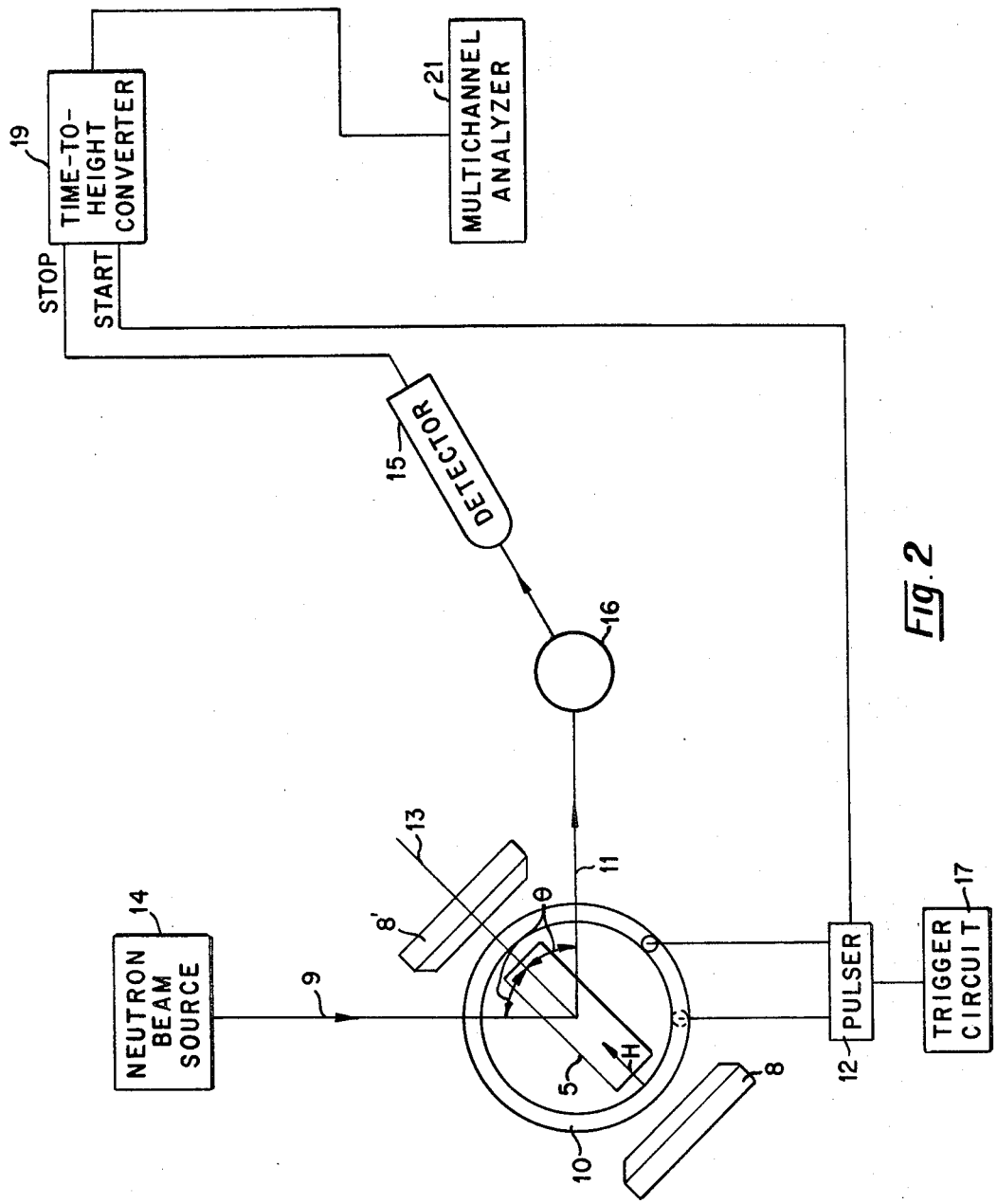
FIG. 2 is a schematic representation of a time-of-flight spectrometer having a magnetic neutron beam pulser according to the present invention.

Referring now to FIG. 2, there is illustrated schematically a simple time-of-flight spectrometer having the magnetic neutron pulser of the present invention, often referred to as a neutron chopper. The crystal 5 is placed in a relatively weak magnetic field H applied by a permanent or D.C. magnet with pole pieces 8, 8' to suppress the scattered beam intensity. A flux compressing magnetic drive coil 10 is wound around crystal 5 and connected to a pulser 12 in a manner so as to provide a pulsing magnetic field H' (FIG. 1) perpendicular to field H. When field H' is present, as pointed out above, the scattered reflection intensity is increased to a maximum value. Pulser 12 is triggered by a trigger circuit 17 in a manner to be explained later in the description of a specific pulser to provide short duration, high current pulses to coil 10.

In a typical spectrometer arrangement, a neutron detector 15 is positioned at a known distance from the reflecting crystal 5 to detect neutrons scattered from a sample 16. The remaining circuitry of the spectrometer may take various forms depending upon the nature of spectral measurements to be made. A very simple form is shown in FIG. 2 which includes a time-to-height converter 19 which has separate "start" and "stop" inputs. The start input is connected to an output of pulser 12 which initiates the timing interval for each pulse output to coil 10, allowing a pulse of neutrons to be reflected from the crystal 5 toward sample 16. The output of detector 15 is connected to the "stop" input of converter 19 and stops the timing interval. The timing interval which is a measure of the time-of-flight of the neutron pulse from crystal 5 to detector 15 is proportional to the momentum of the neutron and thus the output of converter 19 is a pulse whose amplitude is proportional to the neutron momentum. This pulse is then stored in a multichannel pulse height analyzer 21 for subsequent use and analysis.

The magnetic intensity of the neutron reflection from crystal 5, as pointed out above, greatly depends on the orientation of the atomic magnetic moments relative to the scattering vector direction 13, and the intensity becomes zero when the moments are directed along the scattering vector. It has been found that certain crystals, such as $^7$lithium-titanium ferrites have Bragg-type reflections for neutrons which have very low nuclear scattering intensities and exhibit large magnetic scattering intensities when the external field is applied by drive coil 10, aligning the magnetic moments perpendicular to the scattering vector. A suitable crystal must have a net moment such that essentially a single magnetic domain can be produced by the externally applied field. This means that the crystal must be either a ferromagnet or a ferrimagnet with a collinear spin system that allows each spin to be aligned along the magnetic field. Also, the magnetic anisotropy must be small so that the magnetization can be switched easily and rapidly. Since the crystal operates also as a monochromator as well as a pulser, it should have a high neutron reflectivity. Consequently, the material should have a high Curie point and a high melting point as well as low neutron absorption.

Applicants have found that certain of the ferrites that crystallize in the spinel structure possess all of these requirements. There are two sites that the metal ions occupy in the spinel lattice, which are called the octahedral and tetrahedral sites or, more simply, the A and B sites. The structure factors for the (111) and (331) (Miller Indices) reflections of the spinel lattice are given below:

$$F_{(111)} = 8f_A - 4\sqrt{2}f_B + \Delta$$

$$F_{(331)} = 8f_A - 4\sqrt{2}f_B + \zeta$$

In these expressions, $f_A$ and $f_B$ refer to the scattering amplitudes of the atoms on the A and B sites, and $\Delta$ and $\zeta$ are the oxygen contributions to the reflection. Applicants have found that for these reflections the nuclear part of the structure factor may be made zero by placing atoms with the correct nuclear scattering amplitude on the A and B sites. However, the magnetic moments of the atoms on the A and B sites are oppositely directed so that the magnetic scattering from the atoms is in phase for these reflections and the magnetic intensity is a maximum. The magnetic structure factor for the (331) reflection is about 2.5 times smaller than that for the (111) reflection because of the magnetic form factor. For a more detailed discussion of crystalline structure factors please refer to L. M. Corliss and J. M. Hastings, Phys. Rev. 90, 1013 (1953).

Applicants have found that this nuclear intensity is nearly zero for the (111) reflection of $^7$lithium ferrite crystals near the composition ($Fe_{2.5}{}^7Li_{0.5}O_4$) and for the (331) reflection of ($Fe_{2.9}{}^7Li_{0.1}O_4$). For the (111) reflection a small amount of titanium can be added to the crystal to further reduce the nuclear scattering in the reflection. Crystals of this composition have low magnetic anisotropy, Curie points of about 600° C., melting point about 1500° C., and small neutron absorption which enables thick crystals to be used. The magnetization of these crystals can be switched from one direction to another very rapidly.

The above crystals were grown to the size of ¼ inch by 1 inch by ¾ inch. The crystals were placed in a steady magnetic field of about 1.5 kilogauss along the scattering vector direction to prevent the inherent magnetic scattering and when pulsed by a magnetic field of about 4 kg. in a direction perpendicular to the scattering vector, the scattered beam intensity increased to approximately 85% of the maximum reflection. This deviation from 100% is due to the fact that the direction of magnetization of the crystal is in the direction of the vector sum of the two fields (H and H') being applied and therefore is not exactly perpendicular to the scattering vector.

Other ferrite crystals have been provided which also exhibit all of the requirements as set forth above, for example, nickel and manganese ferrites. In the case of manganese ferrite, copper is introduced into the crystal to reduce the nuclear intensity.

Figure 3:
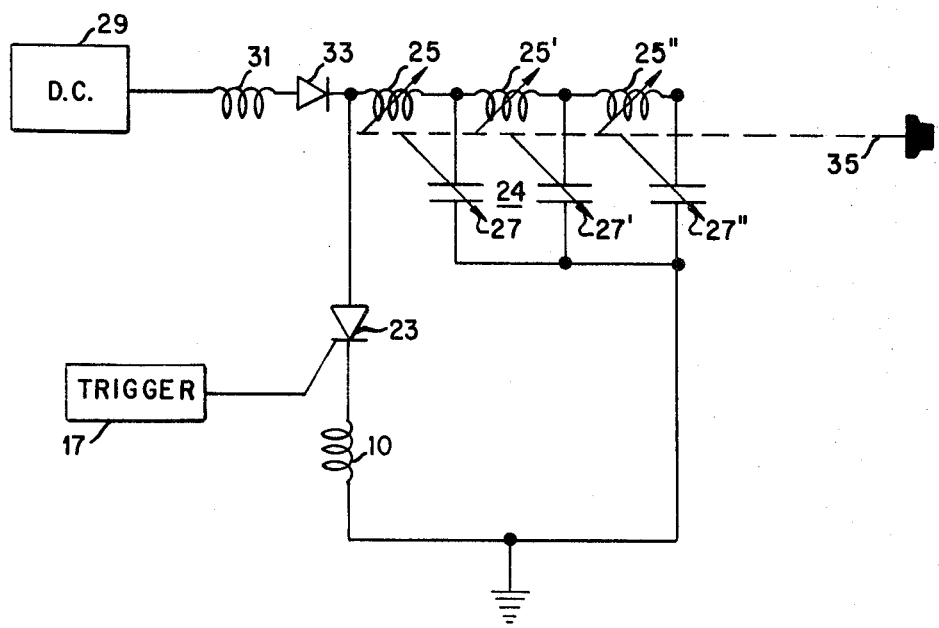
FIG. 3 is a schematic diagram of a circuit which is preferred for use as the pulser of FIG. 2.

The pulsed magnetic field is obtained from the pulser 12 (FIG. 2) which is preferably a pulse forming network, shown schematically in FIG. 3 together with trigger circuit 17. Circuit 17 in its simplest form may be a manually operated switch and voltage source which upon closure applies a voltage to the gate lead of a silicon control rectifier (SCR) 23. SCR 23 is connected in series with the crystal drive coil 10 which is grounded at its opposite end from the SCR 23 connection. The pulse forming network 24 consists of a series of inductors 25 each shunted to ground by a charging capacitor 27. The circuit is charged from a D.C. voltage source 29 connected to the first inductor 25 through a series charging choke 31 and diode 33. The circuit is designed so that the charging period is short compared to the desired repetition rate of the instrument. Once the circuit is charged, the stored energy is sent through the crystal magnet drive coil 10 when a trigger pulse is applied to the SCR gate lead. In order to switch the currents involved in discharging the pulse forming network 24, additional SCR's may be connected in various series parallel arrangements to facilitate the current flow through coil 10. For example, in the particular magnetically pulsed time-of-flight spectrometer discussed above, the drive coil 10 contains 20 turns to which is applied a 500-ampere pulse of current for approximately 12 microseconds. The current pulses have a rise time of less than 2 microseconds and can be produced at rates as high as 1200 hz. The length of the pulse is adjusted by the pulse forming network 24, and it can be changed easily by making each component variable from a single shaft 35, as shown in FIG. 3.

In operation, crystal 5 and its associated assembly of magnetic pole pieces 8 and 8' (FIG. 2) and magnetic drive coil 10 are aligned so that the neutron beam 9 from a source 14 is directed at an acute angle $\theta$ with respect to the scattering vector direction. The sample 16 is positioned a known distance from the crystal and in line with the scattered beam 11 so that when the crystal 5 is pulsed by means of pulser 12 the neutron beam will be directed toward the sample. The detector 15 is placed at a known distance from the sample 16 and at a fixed or variable angle with respect to the direction of the pulsed beam 11. Neutrons scattered from the same 16 at specific angles are counted by the detector. When the pulser is triggered it initiates the timing period by applying a start signal to converter 19 and when the beam pulse scattered from the sample 16 is detected by detector 15, a pulse is applied to the stop input of converter 19 stopping the timing interval. At this point converter 19 presents an output pulse to the input of the pulse height analyzer 21 whose amplitude is proportional to the time-of-flight of the neutron pulse from the crystal 5 to the detector 15. This pulse is then recorded and stored in analyzer 21. Since the time-of-flight of the neutrons is proportional to the square root of the energy of the neutrons, the pulses stored are then indicative of the neutron energy and measure energy changes on scattering by the sample 16. The neutron pulses need not have a regular repetition rate. In certain measurements coded sets of pulses are used for each analyzer cycle to avoid frame overlap problems and gain neutron intensity. A particular code is programed in a special trigger circuit 17 to control pulser 12 accordingly.

Although a preferred embodiment has been shown and described herein, obviously many modifications may be made within the scope of the present invention. For example, when large crystals are used which require high current pulse through the drive coil, a cooling coil can be added around the crystal to extract excess heat generated by the coil and that induced by the switching of magnetic alignment of the crystal. This cooling would be necessary to prevent the crystal from malfunctioning due to overheating.

Thus, it will be seen that a very versatile time-of-flight spectrometer has been provided which offers a combination of simplicity, precision, and flexibility that cannot be duplicated by conventional devices.

In view of the above and numerous other equally possible arrangements, the scope of the invention should be considered limited only by the following claims.

What is claimed is:

1. A magnetic neutron beam pulser comprising: an easily magnetizable crystal having a Bragg reflection with strong magnetic neutron scattering intensity and very weak nuclear neutron scattering intensity, said crystal being predeterminately disposed in a neutron beam for selectively reflecting the neutron beam, said crystal having scattering planes from which said neutron beam directed thereupon at an acute angle is reflected therefrom;

means for continuously providing a constant first magnetic field whose flux lines are perpendicular to said scattering planes to suppress the magnetic scattering intensity of neutrons; and means for selectively applying at predetermined intervals a second magnetic field whose flux lines are applied perpendicular to the flux lines of said first magnetic field, the flux lines of said second magnetic field being substantially greater in magnitude than that of said first magnetic field so that when said second magnetic field is applied the magnetic scattering reflection intensity is increased to a maximum.

2. A magnetic neutron beam pulser as set forth in claim 1 wherein said crystal is an easily magnetizable ferromagnetic or ferrimagnetic ferrite crystal having metal atoms structurally arranged therein so that the crystal has a strong magnetic neutron scattering intensity and a very weak nuclear neutron scattering intensity said metal atoms being chosen so as to provide a collinear spin system within said crystal so that each spin can be aligned along the applied magnetic field, and said crystal having a high neutron reflectivity, a high melting point and low neutron absorption.

3. A magnetic neutron beam pulser as set forth in claim 2 wherein said metal atoms are chosen from the group consisting of lithium, manganese, and nickel.

4. A magnetic neutron beam pulser as set forth in claim 3 wherein said ferrite crystal is a 7lithium-titanium-ferrite crystal.

5. A magnetic neutron beam pulser as set forth in claim 1 wherein said means for providing a first magnetic field includes a D.C. magnet having its pole faces disposed adjacent opposite sides of said crystal so that the flux lines generated thereby are in the same direction as the scattering vector of the Bragg reflection.

6. A magnetic neutron beam pulser as set forth in claim 1 wherein said means for applying at predetermined time intervals a second magnetic field includes a flux compressing magentic drive coil disposed about said crystal so that the flux lines generated thereby are directed through said crystal in a direction perpendicular to the flux lines of said first field and extending out of said crystal through the top surface, and means for selectively applying a current pulse to said drive coil.

7. In a time-of-flight neutron spectrometer including means for supplying a beam of neutrons thereto and means for measuring the flight time of a neutron pulse, a magnetic neutron beam pulser comprising: a magnetizable ferrite crystal having a Bragg reflection with strong magnetic neutrons scattering intensity and very weak nuclear neutron scattering intensity; means for generating a first magnetic field whose flux lines cut said crystal in the same direction as the scattering vector thereby suppressing said magnetic scattering; and means for generating at predetermined intervals a second magnetic field substantially stronger than said first magnetic field whose flux lines cut said crystal in a direction perpendicular to the lines of said first magnetic field so that during the application of said second magnetic field neutrons striking angularly upon said crystal are reflected from said crystal.

8. A magnetic neutron beam pulser as set forth in claim 7 wherein said second magnetic field generating means includes a flux compressing magnetic drive coil disposed about said crystal, a means for generating and applying a high current pulse to said coil, and means for triggering said pulse generating means at selected intervals thereby pulsing the neutron beam.

9. A magnetic neutron beam pulser as set forth in claim 8 wherein said current pulse generating means includes a pulse forming network, a source of D.C. voltage supply coupled to said pulse forming network for charging said network, and a silicon controlled rectifier including an anode, cathode, and gate electrodes, said anode electrode being connected to said pulse forming network, said cathode electrode being connected to said drive coil, and said gate electrode being connected to the output of said triggering means.

References Cited

UNITED STATES PATENTS

| | | | |
|---|---|---|---|
| 2,826,704 | 3/1958 | Wiley | 250—83.1 X |
| 3,067,365 | 12/1962 | Sailor et al. | 250—83.1 X |
| 3,268,730 | 8/1966 | Van de Graaff | 250—83.1 X |

WILLIAM F. LINDQUIST, Primary Examiner

D. L. WILLIS, Assistant Examiner